A. O. IRWIN.
BALL BEARING FOR JOURNAL BOXES.
APPLICATION FILED DEC. 12, 1916.
1,231,366.
Patented June 26, 1917.
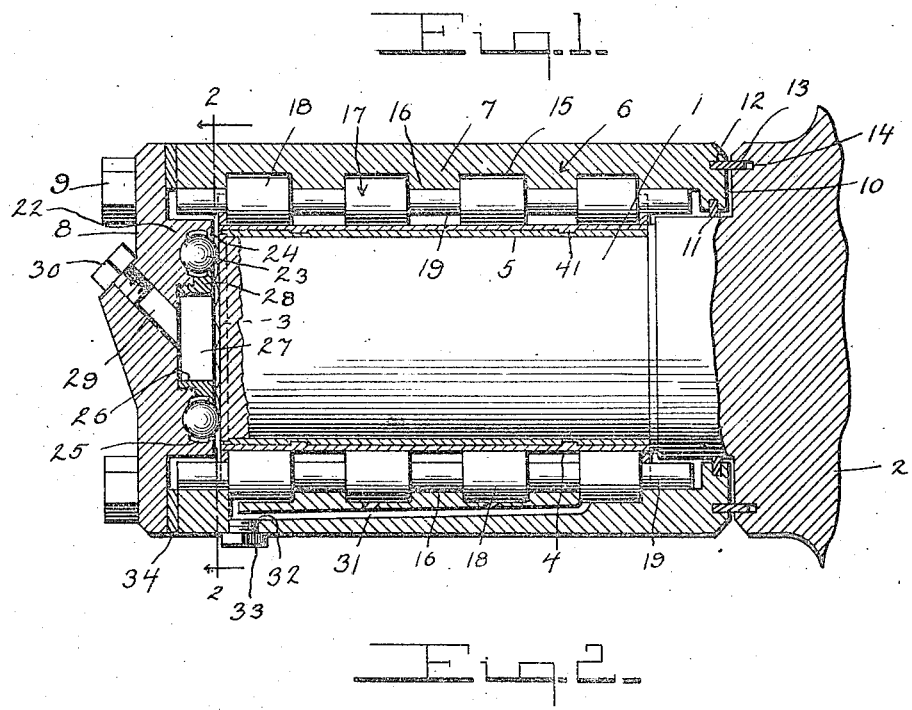
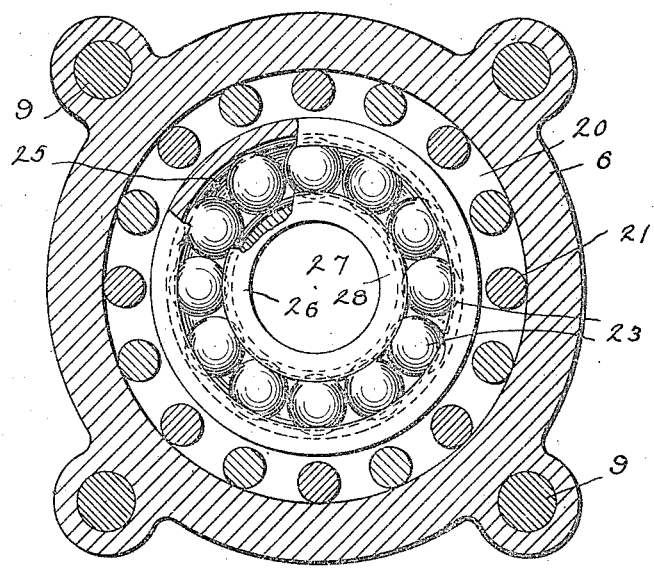
Witnesses
R. M. Jones
W. H. Davidson
Inventor
A. O. Irwin
By
Attorney

UNITED STATES PATENT OFFICE.

ASA O. IRWIN, OF PLATTSBURG, NEW YORK.

BALL-BEARING FOR JOURNAL-BOXES.

1,231,366. Specification of Letters Patent. Patented June 26, 1917.

Application filed December 12, 1916. Serial No. 136,438.

*To all whom it may concern:*

Be it known that I, ASA O. IRWIN, a citizen of the United States, residing at Plattsburg, in the county of Clinton and State of New York, have invented certain new and useful Improvements in Ball-Bearings for Journal-Boxes; and I do hereby declare the following to be a full, clear, and exact description of the invention, such as will enable others skilled in the art to which it appertains to make and use the same.

This invention relates to my Patent Number 1,212,065 for ball and roller bearings for a journal box and has for one of its objects, the provision of means for taking up end thrust upon a shaft.

Another object of this invention is to provide a cylindrical casing rotatably mounted on the shaft and having its open end closed by a head carrying means for taking up end thrust upon the shaft.

A further object of this invention is the provision of means for supporting ball bearings in the head so that they bear against the end of the shaft to take up end thrust.

A still further object of this invention is the provision of ball and roller bearings for a journal box of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, references will be had to the following description and accompanying drawing, in which:

Figure 1 is a longitudinal sectional view of ball and roller bearings for a journal box, constructed in accordance with my invention, Fig. 2 is a transverse sectional view taken on the line 2—2 of Fig. 1.

Referring in detail to the drawings, the numeral 1 indicates an axle or a shaft, having a suitable hub 2 formed on one end thereof and its opposite end screwthreaded to receive a retaining ring 3. A steel casing 4 of greater diameter than the axle or shaft 1, has a plurality of retaining lugs 4' formed upon the interior thereof and is positioned upon the axle or shaft 1, providing a space between the casing 4 and the axle or shaft, which is filled with babbitt, by first removing the ring 3 and pouring the babbitt therein in liquid form, to provide a Babbitt bearing 5 for the axle or shaft and being retained within the casing 4 by the lugs 4'. The end of the Babbitt bearing 5 is reamed to provide an annular shoulder for the reception of the ring 3 when threaded to the end of the axle or shaft 1.

A boxing 6 consists of a casing 7 of cylindrical formation upon the interior thereof and having a head 8 secured to one end by bolts 9. The opposite end of the casing 7 has an inwardly directed annular shoulder 10, having an annular groove in the face thereof to receive a packing gasket 11 which engages the reduced portion of the hub 2. The end of the casing 7 which carries the shoulder 10 has an annular groove 12 for the reception of a packing gasket 13 which is received by an annular groove 14 in the hub 2, for coöperation with the gasket 11 to form an absolute dust and leaf proof connection between the casing 7, the axle or shaft 1 and the hub 2.

The casing 7 is provided with a plurality of annular grooves 15 which form bearings 16 therebetween for a plurality of rollers 17 having enlarged bearing members 18 of equal diameter and small bearing members 19 of equal diameter: the bearing members 18 being located within the annular grooves 15 for an engagement with the casing 4 of the axle or shaft 1 and the bearing members 19 resting upon the bearings 16 of the casing 4 for journaling the rollers 17. Guide rings 20 are mounted on each end of the casing 4 and turn freely thereon and are provided with a circular series of substantially circular grooves 21 for receiving the ends of the rollers 17 to cause them to move or rotate in unison.

The casting 7 projects beyond the outer end of the axle or shaft 1 as illustrated in Fig. 1 to receive a circular enlargement 22 formed on the inner face of the head 8, which has formed thereon an annular groove forming a portion of a raceway to receive ball bearings 23. An annular shoulder 24 has an annular groove which forms a portion of a lubricating groove 25 for lubricating the ball bearings 23. The head 8 is provided with a circular recess 26 in the center thereof, which is provided with its walls screwthreaded to receive a screwthreaded retaining ring 27, having an annular flange 28 formed thereon, which is grooved to form the remaining portion of the lubricating groove 25, and is further provided with an inclined face to engage the outer side of the ball bearings 23. It will be noted that the ball bearings 23 bear against the head 8 or the raceway therein, the shoulder 24, the flange 28 and the end of the axle or shaft 1, to take up all end thrust upon the axle or shaft. An upwardly inclined opening 29 is formed in the head 8 and communicating with the recess 26 and is screwthreaded to receive a plug 30, whereby the ball bearings 23 and rollers 17 may be furnished with lubricating material by filling the recess 26 by way of the opening 29. The lower wall of the casing 7 is provided with a downwardly inclined groove or channel 31, having flanges which communicate with the annular grooves 15 and having an opening 32 communicating with its lowermost end which is screwthreaded to receive a plug 33, whereby the lubricant within the casing 7 may be drained therefrom. A suitable gasket 34 is positioned between the head 8 and the casing 7 to provide a dust and liquid proof connection.

From the foregoing description taken in connection with the accompanying drawing, it will be noted that the ball bearings 23 within the head 8 will take up end thrust upon the shaft or axle 1 owing to them bearing directly against the end of the shaft.

While I have shown and described the preferred embodiment of my invention, it will be understood that minor changes in construction, combination and arrangement of parts may be made without departing from the spirit and scope of the invention as claimed.

Having thus described my invention, what I claim is:

1. A device of the character set forth comprising an axle, a boxing journaled on said axle, a head detachably secured to the boxing and having a screwthreaded circular recess, a screwthreaded retaining ring threaded in said recess, an annular flange formed on said ring, said flange and head having grooves therein, and bearing balls located within said grooves and bearing against the end of the axle to take up end thrust thereon.

2. A device of the character set forth comprising an axle, a boxing journaled on said axle, a head detachably secured to said boxing, an offset portion formed on the inner face of the head and provided with an annular groove, bearing balls positioned within the groove and in engagement with the end of the axle, an annular shoulder formed on the offset portion and in engagement with the bearing balls, said offset portion provided with a circular recess in the center thereof and provided with the walls thereof screwthreaded, a retaining ring threaded in said recess, having an annular flange and engaging the bearing balls to retain said bearing balls in the groove, and means for supplying the recess with lubricant to lubricate the bearing balls and the rollers.

3. A device of the character set forth comprising an axle, a boxing journaled on said axle, a head detachably secured to said boxing, an offset portion formed on the inner face of the head, bearing balls mounted within said offset portion, said offset portion provided with a central recess, means mounted in the recess for holding the bearing balls in the offset portion, said head provided with an upwardly inclined opening in communication with the recess and provided with screwthreads in the walls thereof, a plug threaded to the wall of the upwardly inclined opening, whereby the recess may be furnished with lubricant to lubricate the bearing balls.

In testimony whereof I affix my signature in presence of two witnesses.

ASA O. IRWIN.

Witnesses:
JAMES T. KAVANAGH,
JOSEPH N. LANDRY.